(12) United States Patent
Gao et al.

(10) Patent No.: US 9,621,296 B2
(45) Date of Patent: Apr. 11, 2017

(54) REMOTE NODE DEVICE, OPTICAL NETWORK UNIT AND SYSTEM AND COMMUNICATION METHOD THEREOF

(71) Applicant: Alcatel Lucent, Boulogne-Billancourt (FR)

(72) Inventors: Zhensen Gao, Shanghai (CN); Qingjiang Chang, Shanghai (CN); Lin Gui, Shanghai (CN); Hongqian Mu, Shanghai (CN); Simiao Xiao, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/432,708

(22) PCT Filed: Nov. 12, 2013

(86) PCT No.: PCT/IB2013/002807
§ 371 (c)(1),
(2) Date: Mar. 31, 2015

(87) PCT Pub. No.: WO2014/076565
PCT Pub. Date: May 22, 2014

(65) Prior Publication Data
US 2015/0256285 A1    Sep. 10, 2015

(30) Foreign Application Priority Data

Nov. 14, 2012  (CN) .......................... 2012 1 0457731

(51) Int. Cl.
*H04J 14/02* (2006.01)
(52) U.S. Cl.
CPC ........ *H04J 14/0239* (2013.01); *H04J 14/025* (2013.01); *H04J 14/0236* (2013.01);
(Continued)

(58) Field of Classification Search
CPC ............... H04J 14/0239; H04J 14/0236; H04J 14/0246; H04J 14/025; H04J 14/0282; H04J 2014/0253
(Continued)

(56) References Cited

U.S. PATENT DOCUMENTS

| 5,978,117 A | 11/1999 | Koonen |
| 7,389,048 B2 * | 6/2008 | Kani .................... H04J 14/0226 385/24 |

(Continued)

FOREIGN PATENT DOCUMENTS

| JP | 2012151841 A | 8/2012 |
| KR | 10-2009-0102042 | 9/2009 |
| KR | 10-20120090639 | 8/2012 |

OTHER PUBLICATIONS

Zhao et al., "A Wavelength-Division-Multiplexed Passive Optical Network With Flexible Optical Network Unit Internetworking Capability", Aug. 2007, Journal of Lightwave Technology, vol. 25, No. 8, pp. 1970-1976.*

(Continued)

*Primary Examiner* — Dalzid Singh
(74) *Attorney, Agent, or Firm* — Harness, Dickey & Pierce, P.L.C.

(57) ABSTRACT

A remote node device for mutual communication between optical network units in a passive optical network includes an N×N-arrayed waveguide grating configured to receive upstream optical signal of one of the optical network units and to output this signal as a first optical signal; a 1×2 wavelength division multiplexer configured to separate per band the first optical signal to obtain a second optical signal; and a 1×(N−1) power distributor configured to transmit the second optical signal to the corresponding optical network unit through the N×N-arrayed waveguide grating.

8 Claims, 4 Drawing Sheets

(52) U.S. Cl.
CPC ...... *H04J 14/0246* (2013.01); *H04J 14/0282* (2013.01); *H04J 2014/0253* (2013.01)

(58) Field of Classification Search
USPC .......................................................... 398/87
See application file for complete search history.

(56) References Cited

U.S. PATENT DOCUMENTS

| | | | | |
|---|---|---|---|---|
| 2008/0166129 | A1* | 7/2008 | Luo .................... | H04J 14/0226 398/87 |
| 2008/0298799 | A1* | 12/2008 | Takihiro ............. | H04L 12/2861 398/2 |
| 2010/0142955 | A1* | 6/2010 | Yu .................... | H04B 10/25754 398/72 |
| 2012/0237220 | A1* | 9/2012 | Presi .................. | H04B 10/2587 398/50 |

OTHER PUBLICATIONS

Deng et al., "Intra and Inter-PON ONU to ONU Virtual Private Networking using OFDMA in a Ring Topology", 2011, IEEE, pp. 176-179.*

Qiguang Zhao et al., "A Wavelength-Division-Multiplexed Passive Optical Network With Flexible Optical Network Unit Internetworking Capability", Journal of Lightwave Technology, vol. 25, No. 8, Aug. 2007, pp. 1970-1977.

Lei Deng et al., "Intra and Inter-PON ONU to ONU Virtual Private Networking using OFDMA in a Ring Topology", Proceedings of the 2011 IEEE WMP, pp. 176-179.

Qiguang Zhao et al., "A Novel Internetowrking Scheme for WDM Passive Optical Network based on Remodulation Technique", Optical Society of America, 2006, 3 pages.

International Search Report PCT/ISA/210 for International Application No. PCT/IB2013/002807 Dated Apr. 24, 2014.

Written Opinion of the International Searching Authority PCT/ISA/237 for International Application No. PCT/IB2013/002807 dated Apr. 24, 2014.

Wolfgang Kiess et al., "Protection scheme for passive optical networks shared between a fixed and a mobile operator, Optical Fiber Communication Conference and Exposition (OFC/NFOEC)," 2012 and the National Fiber Optic, U.S., IEEE, Mar. 4, 2012, pp. 1-3.

Lei Zong et al., "A Novel Protection Scheme for WDM-PONs Using Waveband Filters, European Conference on Optical Communications," 2006. ECOC 2006., U.S., IEEE, Sep. 24, 2006, pp. 1-2.

Frank J. Effenberger et al., "Next-generation PON-part II: Candidate systems for next-generation PON," IEEE Communications Magazine, IEEE, Nov. 2009, vol. 47, Issue 11, pp. 50-57.

* cited by examiner

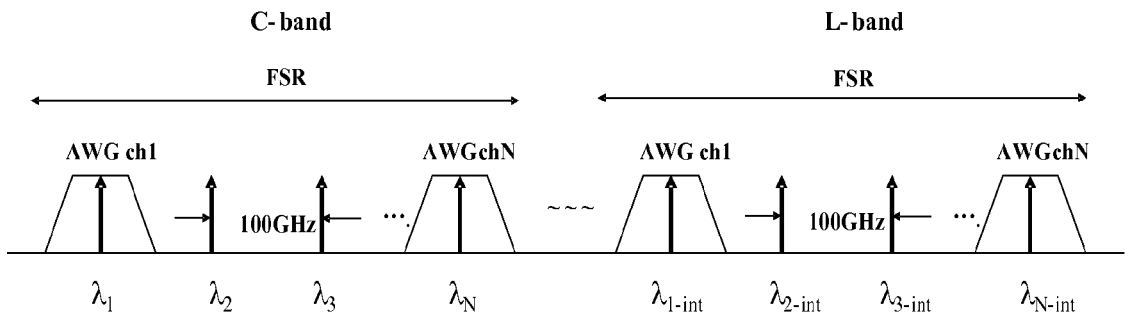

FIG.4

| ONU | 1 | 2 | 3 | ... | N |
|---|---|---|---|---|---|
| DS/US | $\lambda_1$ | $\lambda_2$ | $\lambda_3$ | ... | $\lambda_N$ |
| Inter-ONU | $\lambda_{1\text{-int}}$ | $\lambda_{2\text{-int}}$ | $\lambda_{3\text{-int}}$ | ... | $\lambda_{N\text{-int}}$ |

FIG.5

| I/O | O 1 | O 2 | O 3 | ... | O (N-1) | O (N) |
|---|---|---|---|---|---|---|
| I 1 | $\lambda_1$ | $\lambda_2$ | $\lambda_3$ | | $\lambda_{N-1}$ | $\lambda_N$ |
| I 2 | $\lambda_2$ | $\lambda_3$ | $\lambda_4$ | | $\lambda_N$ | $\lambda_1$ |
| I 3 | $\lambda_3$ | $\lambda_4$ | $\lambda_5$ | | $\lambda_1$ | $\lambda_2$ |
| ... | | | | | | |
| I (N-1) | $\lambda_{N-1}$ | $\lambda_N$ | $\lambda_1$ | | $\lambda_{N-3}$ | $\lambda_{N-2}$ |
| I (N) | $\lambda_N$ | $\lambda_1$ | $\lambda_2$ | | $\lambda_{N-2}$ | $\lambda_{N-1}$ |

FIG.6

REMOTE NODE DEVICE, OPTICAL NETWORK UNIT AND SYSTEM AND COMMUNICATION METHOD THEREOF

FIELD OF THE INVENTION

The present disclosure relates to a passive optical network, and more particularly to a remote node device, optical network unit and system and communication method thereof for mutual communication between optical network units in a passive optical network.

BACKGROUND OF THE INVENTION

A Passive optical network (PON) has been proposed as a very promising solution to a broadband optical access network. A variety of PON solutions have been proposed in recent years, such as TDM-PON, WDM-PON, OCDM/OFDM-PON and so on. Particularly, the TDM-PON technology based EPON and 10 GPON have been standardized and are currently being deployed in many countries, and these solutions can offer a data transmission rate up to 10 Gbits/s, but there are rapidly developing Internet services and constantly increasing bandwidth demands, and it is desirable from the perspective of a long term to define a next-generation PON (NGPON) access system capable of being compatible with the current PON system while offering a bandwidth far above 10 Gbits/s.

While the OCDM/OFDM-PON is still in its infancy, the WDM-PON is a relatively mature alternative solution capable of a data rate above 40 Gbits/s. In the WDM-PON, each ONU is allocated with a dedicated wavelength, and the WDM-PON has numerous advantages of a high capacity, compatibility with the legacy PON, etc. With a number of stacked wavelengths, the total capacity per feeder fiber can easily exceed 40 Gbits/s and even reach 100 Gbits/s.

However, besides the need to satisfy a bandwidth demand for a downstream/upstream signal between an Optical Line Terminal (OLT) and each Optical Network Unit (ONU) in WDM-PON, intercommunication between different ONUs has become essential because a user can thereby share data with another ONU at a very high speed and a low delay. In an example of such an application scenario, universities and enterprises need to communicate a high amount of data between their different campuses or branches or different base stations need to cooperatively operate with each other. However in conventional WDM-PON architecture, direct intercommunication is not possible between the different optical network units, because only upstream and downstream transmission links between the optical line terminal and each optical network unit are available, thus greatly limiting the flexibility and efficiency of the network.

In order to enable communication between the different optical network units, there are conventional solutions as illustrated in FIG. 1(a) and FIG. 1(b). In FIG. 1(a), the different optical network units are fiber-connected, and this enables direct communication between the different optical network units, but a large amount of wiring means will induce both a high wiring cost and troublesome network maintenance. Moreover, there is another solution as illustrated in FIG. 1(b) where different optical network units communicate with each other over a communication link of the optical network units to the optical line terminal via a remote node, but such communication has to undergo two conversions of optical to electronic to optical (O-E-O), and moreover, there is generally a large distance, typically tens of kilometers, between the optical network units and the optical line terminal, so both such a transmission distance and the optical to electronic to optical conversion process will necessarily incur an extra delay in communication between the optical network units, and will also add to an effort of processing at the optical line terminal and increase the complexity of the system.

SUMMARY OF THE INVENTION

In view of the prior art and the technical problem thereof identified as above, it will be very beneficial if it is possible to provide a method of mutual communication between optical network units at a low cost and a corresponding device and system thereof.

According to a first aspect of the invention, there is proposed a remote node device for mutual communication between optical network units in a passive optical network, wherein the passive optical network includes an optical line terminal, the remote node device and the optical network units, and the remote node device includes:

an N×N-arrayed waveguide grating configured to receive upstream optical signal of one of the optical network units and to output it as a first optical signal, wherein the first optical signal includes a first part in a first band for communication between the optical network unit and the optical line terminal and/or a second part in a second band for mutual communication between the optical network units, and the first band is different from the second band;

a 1×2 wavelength division multiplexer configured to separate per band the first optical signal into the first part and to transmit the first part to the optical line terminal, and/or into the second part and to output the second part as a second optical signal; and a 1×(N−1) power distributor configured to transmit the second optical signal to (N−1) terminals of the N×N-arrayed waveguide grating other than a terminal from which the first optical signal is outputted and a terminal for connection with the optical network unit and to transmit the second optical signal to the corresponding optical network unit through the N×N-arrayed waveguide grating.

According to a second aspect of the invention, there is proposed an optical network unit for mutual communication between the optical network units in a passive optical network, the optical network unit including:

a wavelength division multiplexer, with an input terminal and first and second output terminals, configured to separate optical signals received from the input terminal, including a first optical signal in a first band and a second optical signal in a second band, into the first optical signal outputted from the first output terminal and the second optical signal outputted from the second output terminal;

an optical distributor, with an input terminal connected with the first output terminal, configured to separate the first optical signal into a third optical signal and a fourth optical signal including the same information as the third optical signal;

a first receiver connected with the optical distributor, configured to receive the third optical signal from the optical distributor and to receive the downstream data in the third optical signal;

a modulation device connected with the optical distributor, configured to reflect and modulate the fourth optical signal to transmit the upstream data in the first band;

a transmitter configured to transmit the optical signal in the second band for mutual communication between the optical network units through the wavelength division multiplexer; and a second receiver configured to receive the second optical signal from the wavelength division multiplexer and to receive the downstream data in the second optical signal, wherein the first band is different from the second band.

In an embodiment, the modulation device is a transmitting modulator configured to reflect and modulate the fourth optical signal to transmit the upstream data in the first band.

In an embodiment, the optical network unit is a base station in a wireless communication network.

According to a third aspect of the invention, there is opposed an optical network transmission system for mutual communication between optical network units in a passive optical network, the system including the remote node device according to the first aspect, a plurality of optical network units according to the second aspect, and an optical line terminal connected with the remote node device.

In an embodiment, each of the optical network units for mutual communication between the optical network units has a unique wavelength in the first band and a unique wavelength in the second band.

In an embodiment, each of the optical network units for mutual communication between the optical network units has a unique wavelength in the first band and a unique wavelength in the second band with a spacing of 100 GHz between the two unique wavelengths.

With the inventive solution, mutual communication between optical network units can be enabled through a remote node device alone simply by structurally modifying the remote node device and the optical network units without modifying a conventional optical line terminal, and in the meantime, an optical signal for communication will not undergo an optical to electronic to optical conversion process, that is, communication between the different optical communication units can be performed without a communication link between the optical network units and the optical line terminal through the remote node, thereby avoiding a delay resulting from a transmission distance of tens of kilometers; and moreover, the signal will be optically present throughout the communication process without optical to electronic conversion and subsequent electronic to optical conversion. These two aspects can act together to greatly lower the delay in communication.

According to a fourth aspect of the invention, there is provided a method for mutual communication between optical network units in a passive optical network, the method including:

a. an N×N-arrayed waveguide grating in a remote node device receiving an optical signal including a first part in a first band and a second part in a second band from one or more of at most N optical network units connected with the N×N-arrayed waveguide grating, and transmitting the optical signal to a wavelength division multiplexer in the remote node device;

b. the wavelength division multiplexer separating the optical signal into the first part and the second part, and transmitting the first part to an optical line terminal connected with the remote node device and the second part to a power distributor in the remote node device;

c. the power distributor equally dividing the second part into (N−1) parts with the same content and transmitting the (N−1) parts respectively to the N×N-arrayed waveguide grating; and d. the N×N-arrayed waveguide grating distributing the second part to the corresponding optical network units, wherein the first band is different from the second band.

BRIEF DESCRIPTION OF DRAWINGS

Other features, objects and advantages of the invention will become more apparent upon review of the following detailed description of non-limiting embodiments taken with reference to the drawings in which:

FIG. 4 illustrates a schematic diagram of a distribution of a first band 'C' and a second band 'L' according to the invention;

FIG. 5 illustrates a list of wavelengths used by respective optical network units;

FIG. 6 illustrates a schematic diagram of a configuration of an N×N-arrayed waveguide grating according to the invention;

Identical or similar devices (modules) or steps will be denoted by identical or similar reference numerals throughout the drawings.

DETAILED DESCRIPTION OF EMBODIMENTS

The following particular description of preferred embodiments will be given with reference to the drawings constituting a part of the invention. The drawings exemplarily illustrate particular embodiments in which the invention can be practiced. The exemplary embodiments are not intended to exhaust all the embodiments of the invention. As can be appreciated, other embodiments can be possible or structural or logical modifications can be made without departing from the scope of the invention. Thus the following detailed description is not intended to be limiting, and the scope of the invention will be defined as in the appended claims.

Figure 1A:
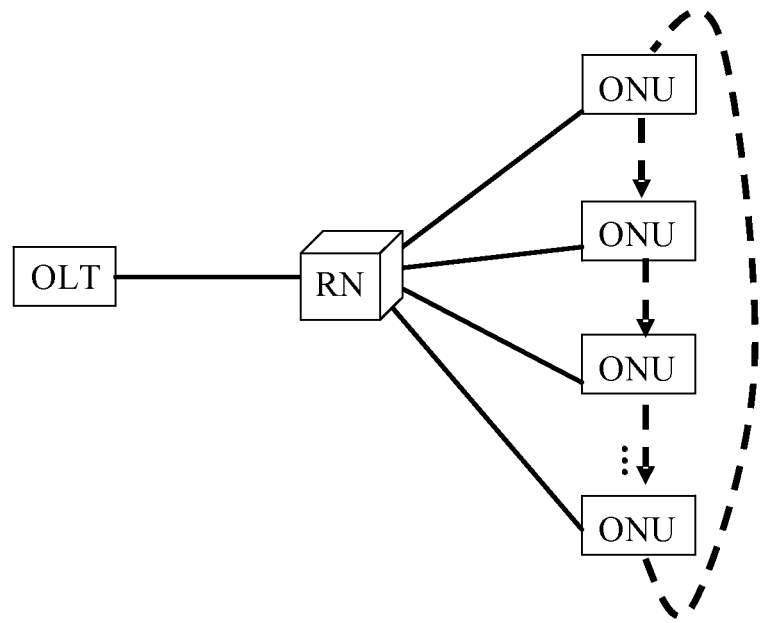
FIG. 1(a) and FIG. 1(b) illustrate schematic diagrams of mutual communication between optical network units in the prior art.
Figure 1B:
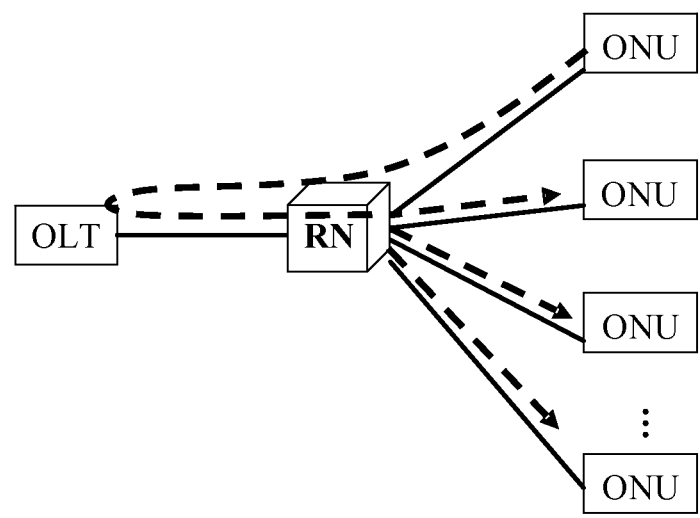

FIG. 1(a) and FIG. 1(b) illustrate schematic diagrams of mutual communication between optical network units in the prior art, and these two figures have been described in the Background of the invention section, so a repeated description thereof will be omitted here.

Figure 2:
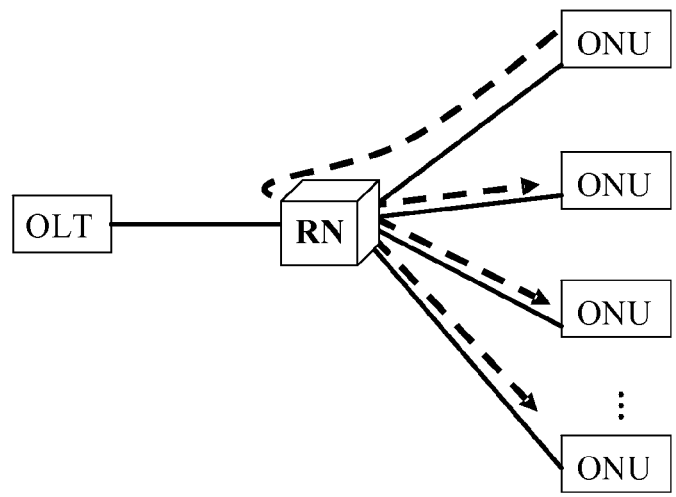
FIG. 2 illustrates a schematic diagram of an inventive idea between optical network units.

In order to overcome the drawbacks of the conventional solution, i.e., those illustrated in FIG. 1(a) and FIG. 1(b), the invention proposes a solution as illustrated in FIG. 2. FIG. 2 illustrates a schematic diagram of an inventive idea between optical network units. In this figure, the communication between an optical network unit and another optical network unit requires no optical signal to be transmitted to an optical line terminal and then transmitted back from the optical line terminal; and no extra fiber will necessarily be further deployed between the different optical network units. Instead, the optical network units can communicate over an existing line between them and a remote node device, and moreover, an optical signal will be returned to the corresponding optical network unit after being transmitted to the remote node device without being transmitted to the optical line terminal, thereby avoiding optical to electronic to optical conversions of the optical signal and thus greatly lowering transmission delay of the signal.

Figure 3:
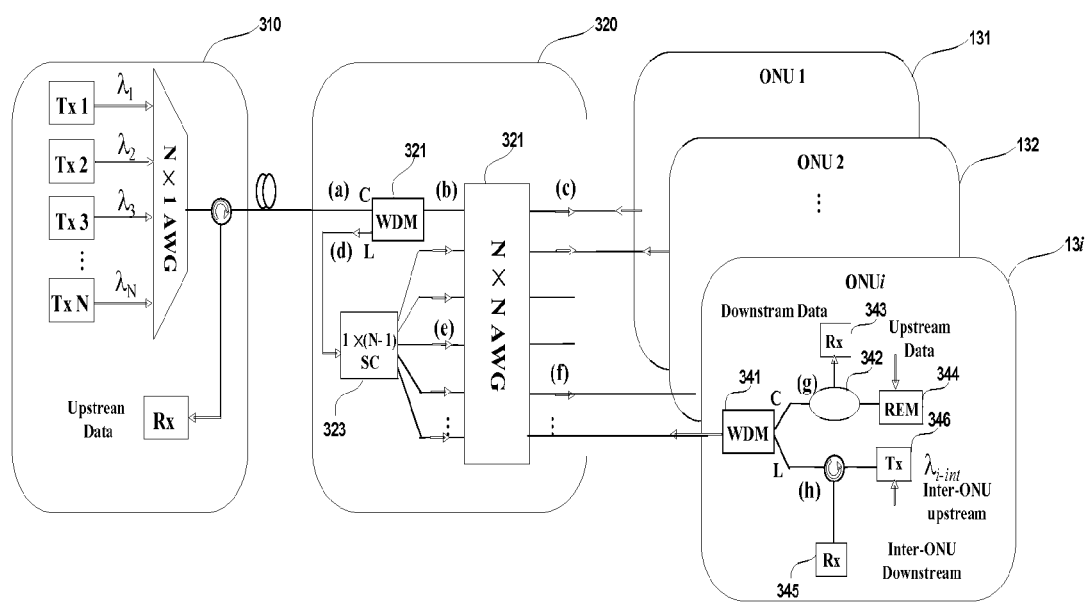
FIG. 3 illustrates a schematic structural diagram of a particular remote node device and optical network unit following the idea illustrated in FIG. 2.

In order to put the inventive idea illustrated in FIG. 2 into practice, the invention proposes a corresponding solution to an improved remote node device and optical network unit in hardware. FIG. 3 illustrates a schematic structural diagram of a particular remote node device and optical network unit following the idea illustrated in FIG. 2. As can be apparent from the figure, there is a remote node device 320 for mutual communication between optical network units in a passive optical network according to the invention, where the passive optical network includes an optical line terminal, the remote node device and the optical network units, and the remote node device includes: an N×N-arrayed waveguide grating 321 configured to receive upstream optical signal of one of the optical network units and to output it as a first optical signal, where the first optical signal includes a first part in a first band for communication between the optical network unit and the optical line terminal and/or a second part in a second band for mutual communication between the optical network units, and the first band is different from the second band; a 1×2 wavelength division multiplexer 322 configured to separate per band the first optical signal into the first part and to transmit the first part to the optical line terminal, and/or into the second part and to output the second part as a second optical signal; and a 1×(N−1) power distributor 323 configured to transmit the second optical signal to (N−1) terminals of the N×N-arrayed waveguide grating other than a terminal from which the first optical signal is outputted and a terminal for connection with the optical network unit and to transmit the second optical signal to the corresponding optical network unit through the N×N-arrayed waveguide grating.

Moreover as illustrated, an optical network unit for mutual communication between the optical network units in a passive optical network according to the invention includes:

A wavelength division multiplexer 341, with an input terminal and first and second output terminals, configured to separate optical signals received from the input terminal, including a first optical signal in a first band and a second optical signal in a second band, into the first optical signal outputted from the first output terminal and the second optical signal outputted from the second output terminal;

An optical distributor 342, with an input terminal connected with the first output terminal, configured to separate the first optical signal into a third optical signal and a fourth optical signal including the same information as the third optical signal;

A first receiver 343, connected with the optical distributor, configured to receive the third optical signal from the optical distributor and to receive the downstream data in the third optical network unit;

A modulation device 344, connected with the optical distributor, configured to reflect and modulate the fourth optical signal to transmit the upstream data in the first band;

A transmitter 346 configured to transmit the optical signal in the second band for mutual communication between the optical network units through the wavelength division multiplexer; and A second receiver 345 configured to receive the second optical signal from the wavelength division multiplexer and to receive the downstream data in the second optical signal, where the first band is different from the second band.

Particularly the optical network unit can be a base station in a wireless communication network, and those base stations configured according to the invention can communicate with each other to thereby cooperatively operate.

Specifically in the transmission process, the optical signal in the first band for communication between the optical network unit and the optical line terminal from the optical signal in the second band for mutual communication between the optical network units are configured with the different bands, so as to distinguish them from each other. FIG. 4 illustrates a schematic diagram of a distribution of the first band 'C' and the second band 'L' according to the invention, whereby this can have the two signals distinguished from each other and is also a criterion of optical splitting by the wavelength division multiplexers 341 and 321. As illustrated in FIG. 4, these two bands L and C are non-overlapping bands. In a single band, there are also different wavelengths for the different optical network units, and each of the optical network units for mutual communication between the optical network units has a unique wavelength in the first band 'C' and a unique wavelength in the second band 'L' with a spacing of 100 GHz between the two unique wavelengths. FIG. 5 illustrates a list of wavelengths used by the respective optical network units. As illustrated in FIG. 5, each optical network unit has the same upstream and downstream wavelengths for communication between the optical network unit and the corresponding optical line terminal and also the same upstream and downstream wavelengths for mutual communication between the optical network units.

FIG. 6 illustrates a schematic diagram of a configuration of an N×N-arrayed waveguide grating according to the invention. The N×N-arrayed waveguide grating in a remote node device according to the invention is configured for achieving a communication between one of optical network units and other optical network units in a broadcasting way. Particularly, the N×N-arrayed waveguide grating is a cyclic N×N-arrayed waveguide grating, where "cyclic" means that an optical signal transmitted from an optical network unit can be transmitted to any other optical network unit than the optical network unit transmitting the optical signal through being broadcasted thereto after being transmitted to a power distributor through a wavelength division multiplexer.

Figure 7:
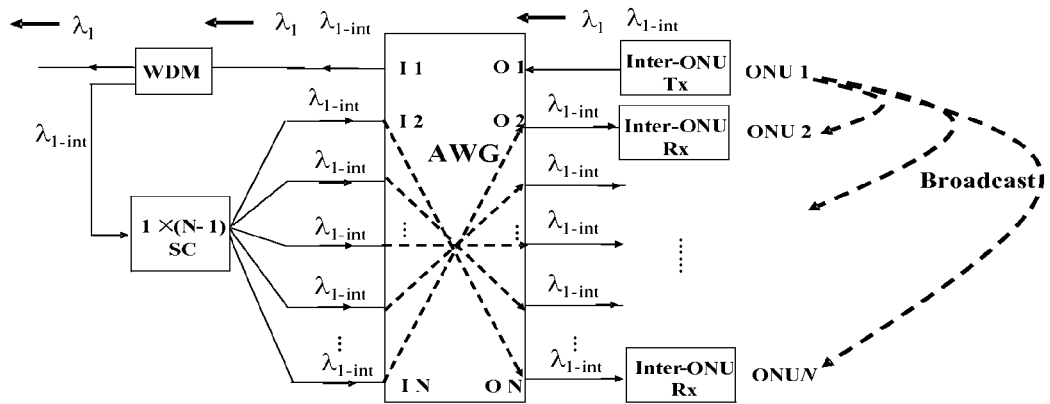
FIG. 7 illustrates a schematic diagram of an embodiment of an optical network unit ONU1 broadcasting a signal to other optical network units.

FIG. 7 illustrates a schematic diagram of an embodiment of an optical network unit ONU1 broadcasting a signal to other optical network units. Taking the optical network unit ONU1 broadcasting a signal to other optical network units as an example for a description, the optical network unit 1 transmits optical signals including λ1 and λ1-int to a Wavelength Division Multiplexer (WDM) through an N×N-arrayed waveguide grating, and the wavelength division multiplexer outputs the optical signal at the wavelength λ1 and transmits the optical signal at the wavelength λ1-int to an I2-IN input terminal of the N×N-arrayed waveguide grating through a power distributor 1×(N−1) SC. With the array illustrated in FIG. 6, the optical signal will be transmitted to all the other optical network units than the optical network unit ONU1, thereby enabling the optical network unit 1 to pass the signal to other optical network units through broadcasting the signal thereto.

Those skilled in the art shall appreciate that the other optical network units each can also transmit a signal to another optical network unit in the same way, and this can be done by the different optical network units concurrently.

Figure 8:
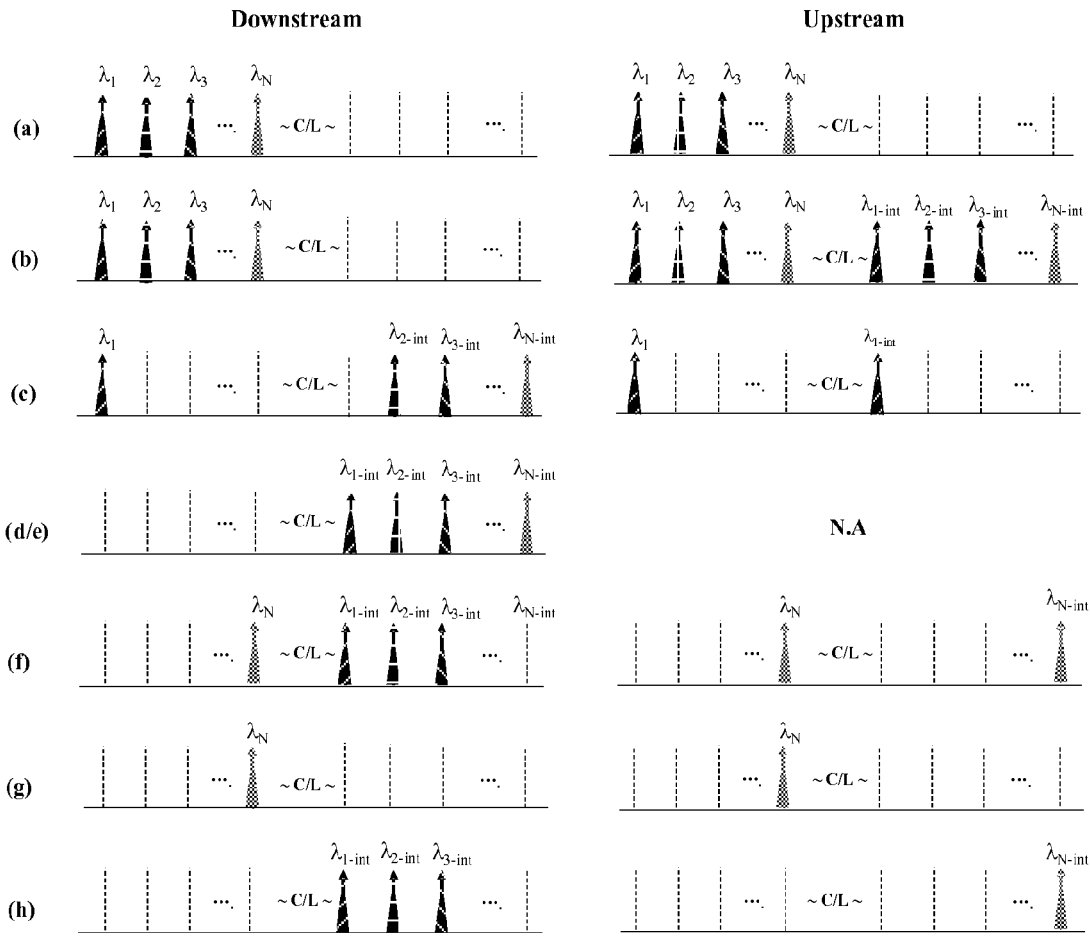
FIG. 8 illustrates a schematic diagram of wavelength combinations at respective locations in FIG. 3.

FIG. 8 illustrates a schematic diagram of wavelength combinations at respective locations in FIG. 3. Firstly, taking the downstream as an example for a description of the figure, in the downstream, there is an optical signal at the wavelengths $\lambda_1$-$\lambda_N$ at (a), and this optical signal will be firstly transmitted to (b) through the wavelength division multiplexer 321 without any change and then to the N×N-arrayed waveguide grating via an I1 terminal, and thereafter optical signal at the respective wavelengths is transmitted to optical network units corresponding to the wavelengths. In the upstream, optical signals are generated firstly by optical network units, and the respectively optical network units transmit the optical signals at $\lambda_i$ and $\lambda_{i\text{-}int}$ (where i represents the serial number of an optical network unit) to output terminals O1-ON of the N×N-arrayed waveguide grating, and then they are assembled and then output to the wavelength division multiplexer WDM 321 from the I1 terminal, and in the wavelength division multiplexer WDM 321, optical signal at the respective lengths in the first band will be output from (a), and optical signal at the respective wavelengths in the second band 'L' will be output from (d), and then the optical signal will be transmitted to (N-1) input terminals I2-IN of the N×N-arrayed waveguide grating through the power distributor 1×(N-1) SC. With the array illustrated in FIG. 6, the optical signal will be transmitted to all the other optical network units than the optical network unit transmitting the optical signal, thereby enabling mutual communication between the optical network units.

With the inventive solution, mutual communication between optical network units can be enabled through a remote node device alone simply by structurally modifying the remote node device and the optical network units without modifying the conventional optical line terminal, and in the meantime, an optical signal for communication will not undergo the optical to electronic to optical conversion process, that is, communication between the different optical communication units can be performed without a communication link between the optical network units and the optical line terminal through the remote node, thereby avoiding delay resulting from a transmission distance of tens of kilometers; and moreover, the signal will be optically present throughout the communication process without optical to electronic conversion and subsequent electronic to optical conversion. These two aspects can act together to greatly lower a delay in communication.

Those skilled in the art shall appreciate that the invention apparently will not be limited to the foregoing exemplary embodiments and can be embodied in other specific forms without departing from the spirit or essence of the invention. Accordingly the embodiments shall be construed anyway to be exemplary and non-limiting. Moreover apparently the term "comprising" will not preclude another element(s) or step(s), and the term "a" or "an" will not preclude plural. A plurality of elements stated in an apparatus claim can alternatively be embodied as a single element. The terms "first", "second", etc., are intended to designate a name but not to suggest any specific order.

The invention claimed is:
1. A remote node device configured for mutual communication between optical network devices in a passive optical network, the passive optical network including an optical line terminal, the remote node device and the optical network devices, the remote node device comprising:
an N×N-arrayed waveguide grating configured to,
receive an upstream optical signal of one of the optical network devices, and
output the upstream optical signal as a first optical signal, the first optical signal including (i) a first part in a first band for communication between the optical network devices and the optical line terminal and (ii) a second part in a second band for mutual communication between the optical network devices, the first band being different from the second band;
a 1×2 wavelength division multiplexer configured to separate per band the first optical signal into (i) the first part and transmit the first part to the optical line terminal, and into (ii) the second part and output the second part as a second optical signal; and
a 1×(N−1) power distributor configured to,
transmit the second optical signal to (N−1) terminals of the N×N-arrayed waveguide grating other than a terminal from which the first optical signal is outputted, and a terminal for connection with the optical network device, and
transmit the second optical signal to the corresponding optical network unit through the N×N-arrayed waveguide grating,
wherein N is a natural number.
2. An optical network device configured for mutual communication between optical network devices in a passive optical network, the optical network device comprising:
a wavelength division multiplexer with an input terminal and first and second output terminals, the wavelength division multiplexer configured to separate optical signals received from the input terminal into a first optical signal outputted from a first output terminal and a second optical signal outputted from a second output terminal, the first optical signal in a first band and the second optical signal in a second band;
an optical distributor with an input terminal connected with the first output terminal, the optical distributor configured to separate the first optical signal into a third optical signal and a fourth optical signal, the fourth optical signal including the same information as the third optical signal;
a first receiver connected with the optical distributor, the first receiver configured to receive the third optical signal from the optical distributor and to receive downstream data in the third optical signal;
a modulation device connected with the optical distributor, the modulation device configured to reflect and modulate the fourth optical signal such that the upstream data is transmitted in the first band;
a transmitter configured to transmit an optical signal in the second band for mutual communication between the optical network devices through the wavelength division multiplexer; and
a second receiver configured to receive the second optical signal from the wavelength division multiplexer and to receive the downstream data in the second optical signal,
wherein the first band is different from the second band, and
N is a natural number.
3. The optical network device according to claim 2, wherein the modulation device is a transmitting modulator configured to reflect and modulate the fourth optical signal to transmit the upstream data in the first band.
4. The optical network device according to claim 2, wherein the optical network device is a base station in a wireless communication network.
5. An optical network transmission system configured for mutual communication between optical network devices in a passive optical network, the system comprising:
a remote node device including,
an N×N-arrayed waveguide grating configured to,
receive an upstream optical signal of one of the optical network devices, and output the upstream optical signal as a first optical signal, the first optical signal including (i) a first part in a first band for communication between the optical network device and an optical line terminal and (ii) a second part in a second band for mutual communication between the optical network devices, the first band being different from the second band, a 1×2 wavelength division multiplexer configured to separate per band the first optical signal into (i) the first part and transmit the first part to the optical line terminal, and into (ii) the second part and output the second part as a second optical signal, and a 1×(N−1) power distributor configured to,
transmit the second optical signal to (N−1) terminals of the N×N-arrayed waveguide grating other than a terminal from which the first optical signal is outputted, and a terminal for connection with the optical network device, and transmit the second optical signal to the corresponding optical network device through the N×N-arrayed waveguide grating;

the plurality of optical network devices according to claim 2; and the optical line terminal connected with the remote node device, wherein N is a natural number.

6. The optical network transmission system according to claim 5, wherein each of the optical network devices is configured to communicate between the optical network devices using a unique wavelength in the first band and a unique wavelength in the second band.

7. The optical network transmission system according to claim 6, wherein the unique wavelength in the first band and the unique wavelength in the second band are separated by 100 GHz.

8. A method for mutual communication between optical network devices in a passive optical network, the method comprising:

receiving, via an N×N-arrayed waveguide grating in a remote node device, an optical signal including a first part in a first band and a second part in a second band from one or more of N optical network devices connected with the N×N-arrayed waveguide grating;

first transmitting, via the N×N-arrayed waveguide grating in the remote node device, the optical signal to a wavelength division multiplexer in the remote node device;

separating, via the wavelength division multiplexer, the optical signal into the first part and the second part;

second transmitting, via the wavelength division multiplexer, the first part to an optical line terminal connected with the remote node device and the second part to a power distributor in the remote node device;

equally dividing, via the power distributor, the second part into (N−1) parts with the same content;

third transmitting, via the power distributor, the (N−1) parts to the N×N-arrayed waveguide grating; and distributing, via the N×N-arrayed waveguide grating, the second part to the corresponding optical network devices, wherein the first band is different from the second band, and N is a natural number.

* * * * *